(12) United States Patent
Johnsen et al.

(10) Patent No.: US 11,982,133 B2
(45) Date of Patent: May 14, 2024

(54) FORCE TRANSFERRING WELLBORE CONNECTOR

(71) Applicant: Autentik AS, Stavanger (NO)

(72) Inventors: Geir Magne Mo Johnsen, Stavanger (NO); Alexander Ibragimov, Sola (NO); Stian Krag, Randaberg (NO)

(73) Assignee: Autentik AS, Stavanger (NO)

( * ) Notice: Subject to any disclaimer, the term of this patent is extended or adjusted under 35 U.S.C. 154(b) by 395 days.

(21) Appl. No.: 17/048,005

(22) PCT Filed: Apr. 23, 2019

(86) PCT No.: PCT/NO2019/050089
§ 371 (c)(1),
(2) Date: Oct. 15, 2020

(87) PCT Pub. No.: WO2019/209115
PCT Pub. Date: Oct. 31, 2019

(65) Prior Publication Data
US 2021/0148174 A1    May 20, 2021

(30) Foreign Application Priority Data
Apr. 23, 2018  (NO) .................................. 20180558

(51) Int. Cl.
*E21B 17/02* (2006.01)
*E21B 37/06* (2006.01)
*F16B 21/02* (2006.01)
(52) U.S. Cl.
CPC ............ *E21B 17/028* (2013.01); *E21B 17/02* (2013.01); *E21B 17/023* (2013.01); *E21B 37/06* (2013.01); *F16B 21/02* (2013.01)

(58) Field of Classification Search
CPC ...... E21B 17/02; E21B 17/028; E21B 17/023; E21B 17/046; E21B 37/06; F16B 21/02
See application file for complete search history.

(56) References Cited

U.S. PATENT DOCUMENTS

| 3,275,354 A | 9/1966 | Sutliff et al. |
| 4,422,794 A | 12/1983 | Deken |

(Continued)

FOREIGN PATENT DOCUMENTS

| EP | 3375973 A1 | 9/2018 |
| GB | 2263203 A | 7/1993 |

(Continued)

OTHER PUBLICATIONS

LøvåS, Bjørn; International Search Report; PCT/NO2019/050089; dated Jul. 5, 2019; 8 pages.

*Primary Examiner* — D. Andrews
(74) *Attorney, Agent, or Firm* — Bradley Arant Boult Cummings LLP (57) ABSTRACT

A force transferring connector (400) having a box part (401). A pin section (408) enters the box part with a lug (411). The box part has a locking shoulder (415). When the pin section (408) is inside the cavity, the lug (411) rotates between a non-engaged and an engaged state. The connector (400) has an electric connection arrangement (470) guiding electric power and/or electric signals. The electric connection arrangement (470) is in a connected state when the pin section (408) is inserted into the receiving cavity (405) and in a non-connected state when the pin section (408) is not inserted into the receiving cavity (405).

14 Claims, 6 Drawing Sheets

(56) References Cited

U.S. PATENT DOCUMENTS

| | | | | |
|---|---|---|---|---|
| 4,784,543 A | * | 11/1988 | Mitchell | B23B 29/046 |
| | | | | 82/158 |
| 4,857,006 A | * | 8/1989 | Linyeav | H01R 13/533 |
| | | | | 439/271 |
| 4,921,438 A | * | 5/1990 | Godfrey | E21B 23/14 |
| | | | | 439/190 |
| 4,986,690 A | | 1/1991 | Cooksey | |
| 5,088,853 A | * | 2/1992 | Reid | F16B 21/02 |
| | | | | 403/348 |
| 5,278,550 A | | 1/1994 | Rhein-Knudsen et al. | |
| 6,439,932 B1 | * | 8/2002 | Ripolone | E21B 17/0285 |
| | | | | 439/924.1 |
| 6,719,479 B1 | * | 4/2004 | Marsh | E21B 17/046 |
| | | | | 166/242.6 |
| 2009/0060646 A1 | | 3/2009 | Wood | |
| 2017/0044840 A1 | * | 2/2017 | Deere | E21B 17/028 |

FOREIGN PATENT DOCUMENTS

| | | |
|---|---|---|
| GB | 2292268 A | 2/1996 |
| WO | WO-9802638 A1 | 1/1998 |
| WO | WO-2007008087 A1 | 1/2007 |
| WO | WO-2014109643 A1 | 7/2014 |
| WO | WO-2015047102 A1 | 4/2015 |
| WO | WO-2016140678 A1 | 9/2016 |

* cited by examiner

FORCE TRANSFERRING WELLBORE CONNECTOR

TECHNICAL FIELD

The present inventions relate to a force transferring wellbore connector.

BACKGROUND ART

In the field of well technology, various tools run on wireline are used to perform well operations. Examples of such tools includes for instance a downhole tractor, a downhole stroker, a fishing tool, and more.

During well operations, time used is costly. Hence, it is desirable to reduce the time used by the operator for connecting and disconnecting a wellbore tool to a well wireline.

There are known various types of force transferring connectors. It is an object of the present invention to provide a force transferring connector that is easy and quick to use, which can carry a significant load, and which simultaneously can transmit electric power and/or signals.

SUMMARY OF INVENTION

According to the present invention, there is provided a force transferring wellbore connector capable of transferring a pulling force of more than five metric tonnes. The force transferring wellbore connector is interchangeable between a connected and a non-connected mode. It comprises a box part and a pin part, wherein the pin part comprises a pin section that is configured to be inserted into a receiving cavity of the box part. The pin section comprises at least one lug and the box part comprises at least one locking shoulder. When the pin section is located inside the receiving cavity, the lug is configured to rotate between a non-engaged state, in which it does not engage the locking shoulder and an engaged state, in which it engages the locking shoulder, so that when in the engaged state the engagement between the locking shoulder and the lug prevents the pin section from movement out of the receiving cavity. According to the fourth aspect of the present invention, the connector further comprises an electric connection arrangement configured to guide electric power and/or electric signals through the connector. The electric connection arrangement is in a connected state when the pin section is inserted into the receiving cavity and in a non-connected state when the pin section is not inserted into the receiving cavity.

When it is said that the connector is capable of transferring a pulling force of more than five metric tonnes, it shall be understood that it is capable of transferring a force corresponding to the weight of five metric tonnes.

With the term wellbore connector, it shall be appreciated that the connector is of the type used for connecting wireline-run wellbore tools to a wireline. As stated above, such tools may be of various kinds used for various operations.

In some embodiments of the invention, the force transferring connector comprises a latching arrangement that is configured to latch the connector in the connected mode. The latching arrangement can comprise a latching groove in the lug. Moreover, the latching arrangement can have a latching lever configured to move radially between a latching position, in which a part of the latching lever is located in the latching groove, and a non-latched position, in which the latching lever is outside the latching groove.

In some embodiments, the latching lever can be hinged to the box part, and be configured to pivot about a pivot axis that is directed orthogonally with respect to the longitudinal direction of the connector. The longitudinal direction of the connector is parallel to the insertion direction, when the pin section of the pin part is inserted into the receiving cavity of the box part.

Advantageously, the latching lever can be recessed in a lever recess formed in a box part housing. In this manner, the latching lever will be protected from abutment with external objects, such as the well bore or foreign objects in a well.

The connector according to the present invention will be particularly useful with wellbore applications. For instance, it may be used to connect and disconnect a wellbore fishing tool, a stroker tool, or any other type of wellbore tool to a line from which the wellbore tool is suspended.

Advantageously, when altering between the engaged and non-engaged state by rotation of the pin part with respect to the box part, the pin part can be rotated less than 180 degrees. Advantageously, it can be rotated less than 100 degrees, such as 90 degrees.

According to a second aspect of the present invention, there is provided a method of performing a well operation inside a wellbore by using a wireline wellbore tool, the method comprising connecting the wellbore tool to a line and running the tool into the wellbore on the line. The method further comprises the following step: during step a), connecting the wellbore tool to the line with a wellbore connector according to the invention, thereby providing a mechanical force-transferring connection and an electric signal and/or power transferring connection.

BRIEF DESCRIPTION OF DRAWINGS

While some general features of some aspects according to the invention have been discussed above, some more detailed examples of embodiment will be given in the following with reference to the drawings, in which.

DETAILED DESCRIPTION OF THE INVENTION

Figure 1:
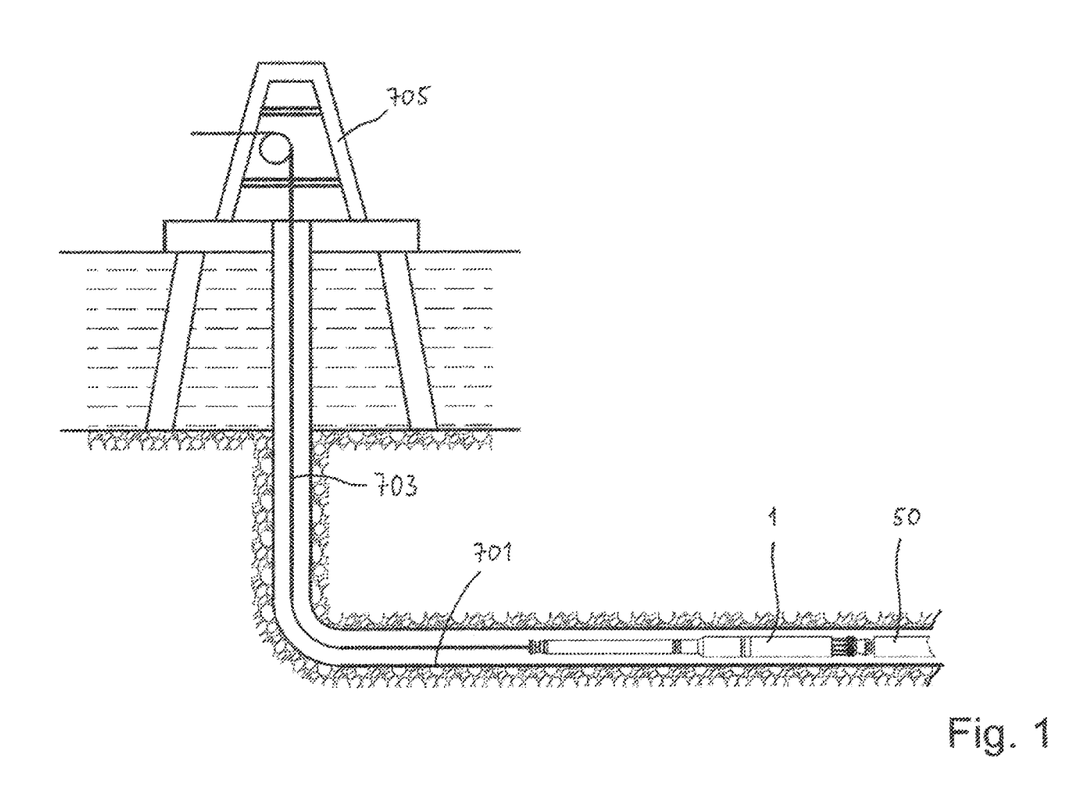
FIG. 1 is a schematic principle view of a fishing tool launched from a surface installation into a subsea well.

FIG. 1 illustrates a typical scenario where a wellbore tool, here in the form of a fishing tool, is used. A piece of downhole equipment, commonly referred to as "a fish" 50, is positioned in a subterranean well 701 and shall be retrieved. In the situation shown in FIG. 1, the well is a subsea well. The fish 50 is positioned in a horizontal portion of the well. The fishing tool 1 is run on a wireline 703 from an offshore surface installation 705. The operator will connect the fishing tool 1 to the fish 50, and then pull them both back up to the surface. If the operator is not able to pull the fish 50 loose, he will disconnect the fishing tool 1 from the fish 50 and retrieve only the fishing tool. It shall be clear that although a fishing tool is discussed in the present example embodiment, other wellbore tools could be used.

Figure 2:
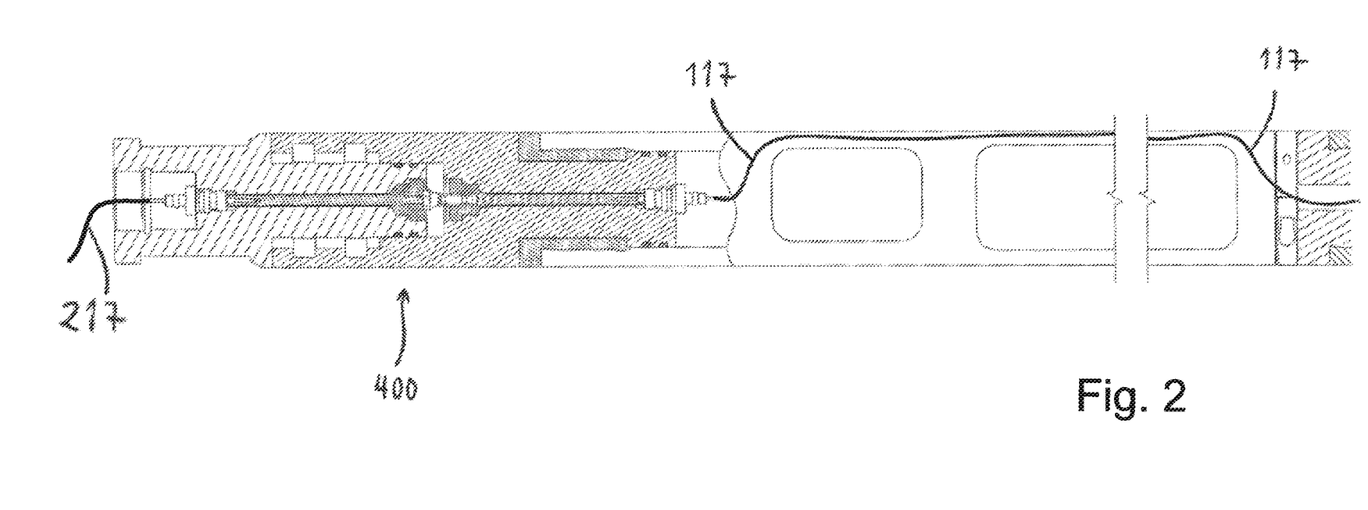
FIG. 2 is another cross-section side view of a rear portion of a possible embodiment of the fishing tool, connected to a connector according to the invention.

FIG. 2 is a cross-section side view of a part of a well tool assembly. A connector 400 according to the present invention is part of the assembly. FIG. 2 schematically illustrates how an electric wire 117 is guided from the connector and towards a well tool. The well tool can for instance be a wireline downhole tractor, stroker, a fishing tool, or any other well tool run on a wireline.

Figures 5, 6:
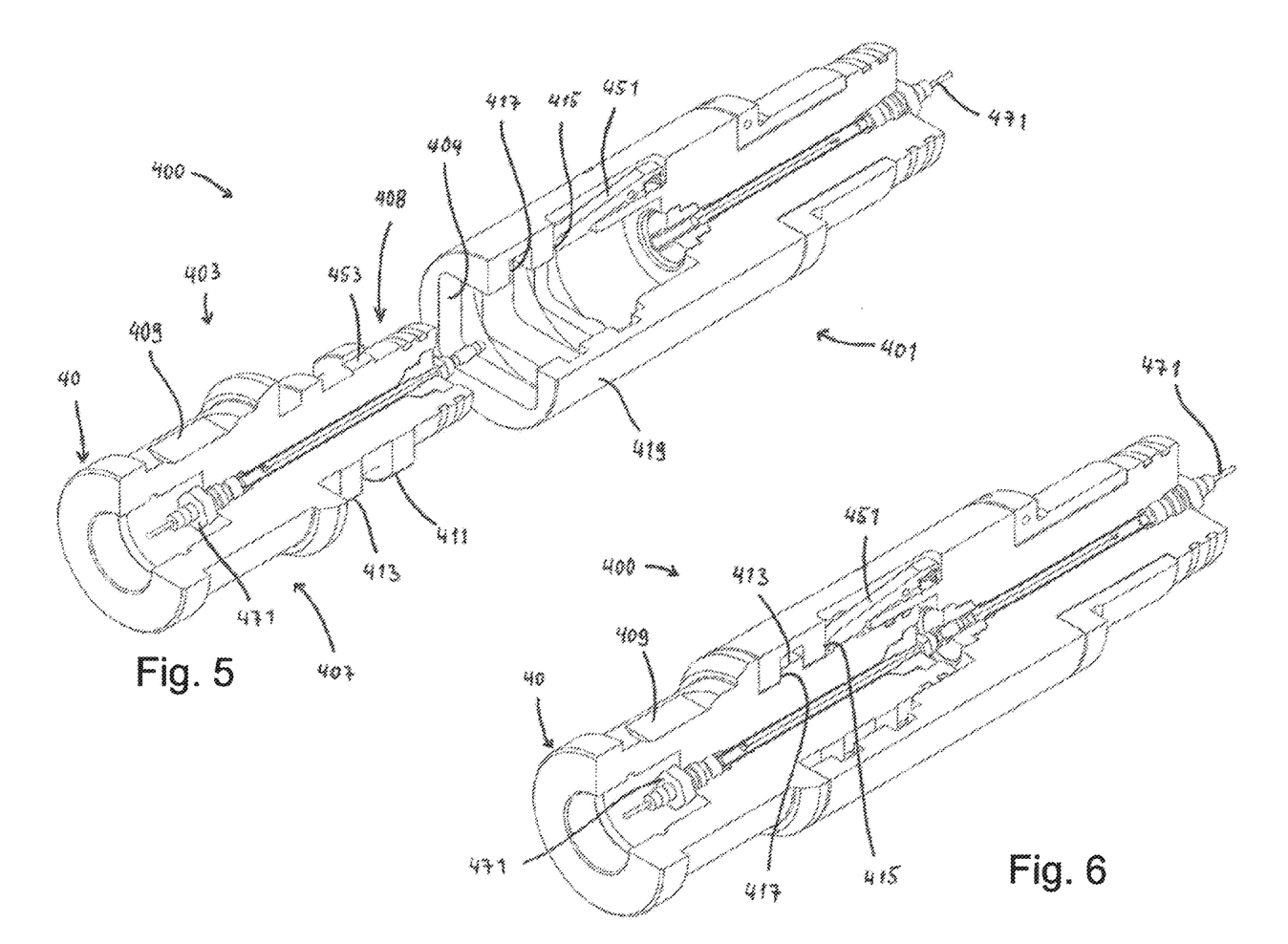
FIG. 5 is a cutaway perspective view of the connector in a non-connected state.
FIG. 6 is a cutaway perspective view of the connector in a connected state.

At a forward end of the connector 400, there is an electric contact element 471, to which the electric wire 117 connects (indicated in FIG. 5). In this embodiment, the connector 400 hence constitutes a connection between the electric wire 117 and the opposite side of the connector 400. Typically, when the connector 400 is used with a wellbore tool, the wellbore tool 1 can be connected to an electric line, such as the line 703 depicted in FIG. 1.

Extending towards the topside location, a second electric wire 217 is indicated in FIG. 2.

Figures 3, 4:
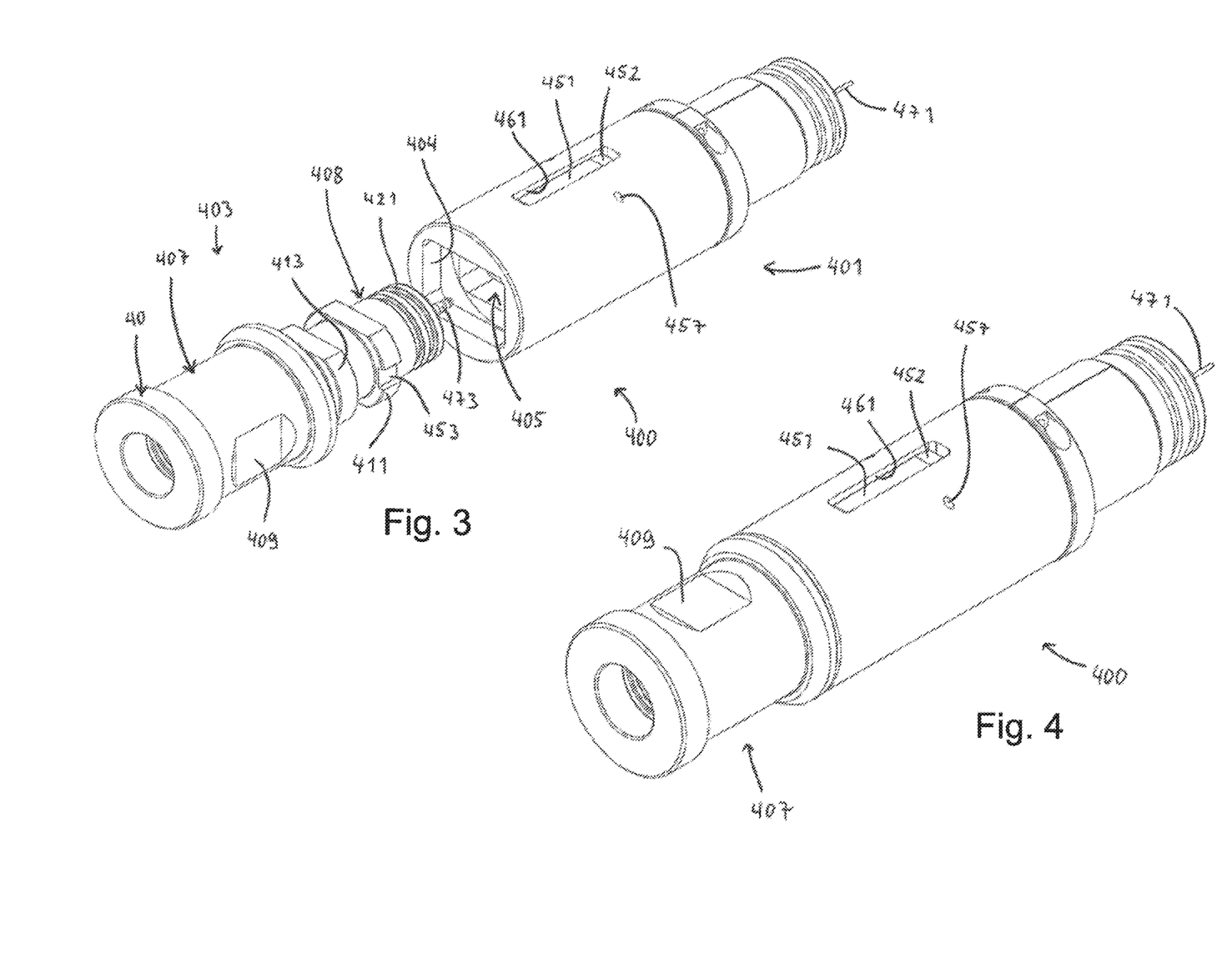
FIG. 3 is a perspective view of a connector according to one aspect of the invention.
FIG. 4 is a perspective view corresponding to FIG. 3, however showing the connector in a connected mode.

Reference is now made to FIG. 3 to FIG. 9, which depict a connector 400. FIG. 3 and FIG. 4 show the connector in a non-connected and a connected state, respectively, with perspective views. The connector 400 comprises a box part 401 and a pin part 403. The pin part 403 is configured to enter a receiving cavity 405 of the box part 401. After insertion of the pin part 403 into the box part 401, a mutual rotation of about 90 degrees, will connect the pin part and the box part. This type of connector is often referred to in the art as a "quick-connector".

At a rear end of the pin part 403 there is a wireline interface 40. The wireline interface 40 may in use be fixed to a wireline, typically an electric line. This connection may be provided with additional non-shown elements. I.e. there may be an additional element at the wireline end, that will be connected to the shown wireline interface 40.

The rear portion of the pin part 403 is a handling section 407, which is configured to remain outside the box part 401 when the connector 400 is in a connected mode. In front of the handling section 407 is a pin section 408, which is configured to enter the receiving cavity 405 of the box part 401.

On the handling section 407 there are two flat handling faces 409, of which only one can be seen in FIG. 3 and FIG. 4. The two handling faces 409 are arranged on opposite sides on the external face of the pin part 403 and are parallel, so that they are suited to be engaged by a tool for rotation of the pin part 403 with respect to the box part 401, typically a large wrench.

The pin section 408 of the pin part 403 has a generally cylindrical shape. However, the pin section 408 is provided with two lugs, namely a front lug 411 and a rear lug 413, that are configured to transfer axial loads through the connector 400. This will be discussed in detail below.

The cavity 405 of the box part 401 has a cavity aperture 404 that is substantially rectangularly shaped, with the mutual distance between two opposite sides being less than the mutual distance between the other two sides. As appears from FIG. 3, the outer perimeter of the front and rear lugs 411, 413 have a mainly circular shape, however with opposite portions of the circle cut away, so that their outer perimeters comprise oppositely facing parallel faces. When the pin part 403 is in the rotational position shown in FIG. 3, the pin section 408 will be able to enter through the cavity aperture 404 and into the receiving cavity 405.

Reference is now made to FIG. 5 and FIG. 6, which depict the non-connected and connected states, respectively, with a part of the connector 400 cut away for illustrational purpose.

In FIG. 5, with the rotational position of the pin part 403, the pin section 408 would not be able to enter through the cavity aperture 404, since the front and rear lugs 411, 413 are not able to fit through the cavity aperture 404. To enter into the cavity 405, the pin part 403 must first be rotated about 90 degrees, so that the lugs 411, 413 are rotationally aligned with the cavity aperture 404.

In the situation shown in FIG. 6, which depicts the connected state, the pin section 408 has been inserted into the cavity 405. Furthermore, the pin part 403 has been rotated 90 degrees when in the inserted state. This rotational movement makes the front and rear lugs 411, 413 engage with respective locking shoulders 415, 417 of the box part 401. This rotation can typically be provided by engaging the handling faces 409 with a wrench.

Figure 8:
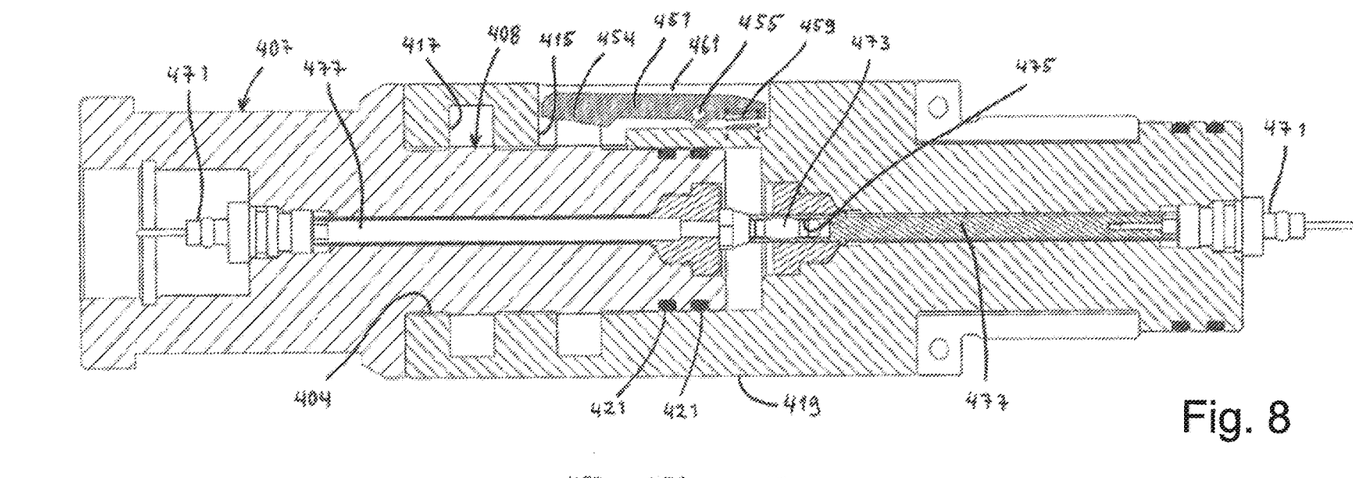
FIG. 8 is a cross-section side view of the connector in a non-latched state.
Figure 9:
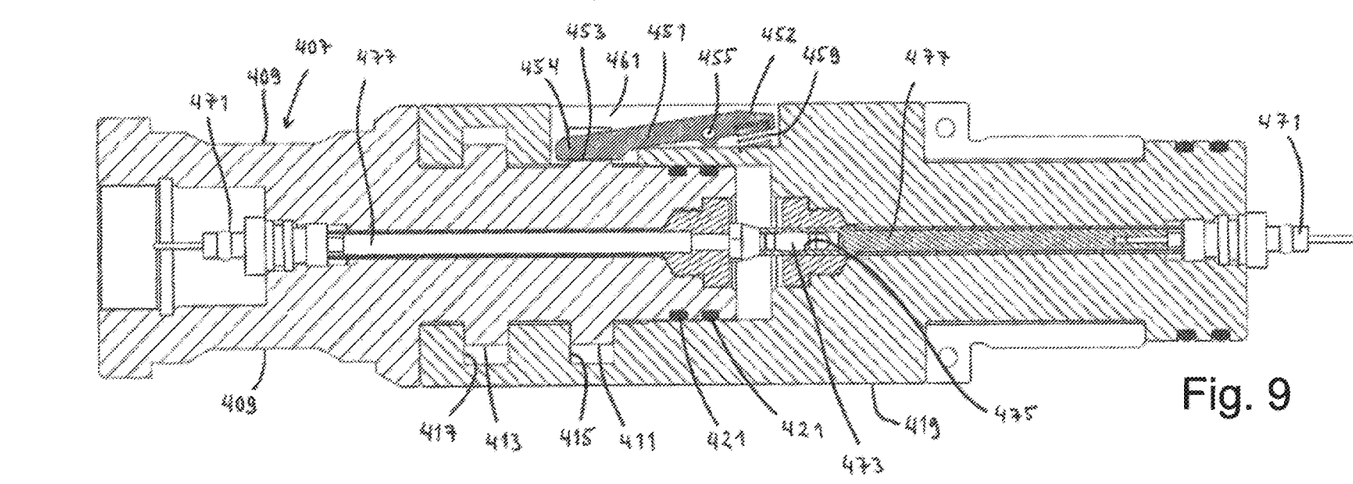
FIG. 9 is a cross-section side view of the connector in a connected and latched state.

FIG. 8 and FIG. 9 depict the pin part 403 in the inserted state before and after this 90-degree rotational movement with respect to the box part 401. As appears from these cross-section views, the front and rear lugs 411, 413 are rotated from a non-engaged state into an engaged state. In the engaged state, the lugs 411, 413 abut the locking shoulders 415, 417 of the box part 401. Advantageously, the locking shoulders 415, 417 are part of a box part housing 419, and extend radially inwards into the receiving cavity 405.

When in the locked state shown in FIG. 6 and in FIG. 9, a large pulling force can be transferred between the box part 401 and the pin part 403. This force will be transferred between the box part 401 and the pin part 403 at the areas where the front and rear lugs 411, 413 abut the locking shoulders 415, 417.

At a cylindrical front part of the pin section 408 there are provided two seals 421. These seals 421 abut against a cylindrical inner wall of the inner portion of the cavity 405.

The connector 400 comprises a latching arrangement 450, which is configured to latch the connector 400 in the connected mode. In the cross-section views of FIG. 8 and FIG. 9, a latching lever 451 is shown in an unlatched mode and a latched mode, respectively. As appears perhaps best from the perspective view of FIG. 3, the front lug 411 comprises a latching groove 453. The latching groove 453 is formed as a recess in the front lug 411 and is configured to receive a part of the latching lever 451 when the pin part 403 is in the engaged and latched position.

Figure 7:
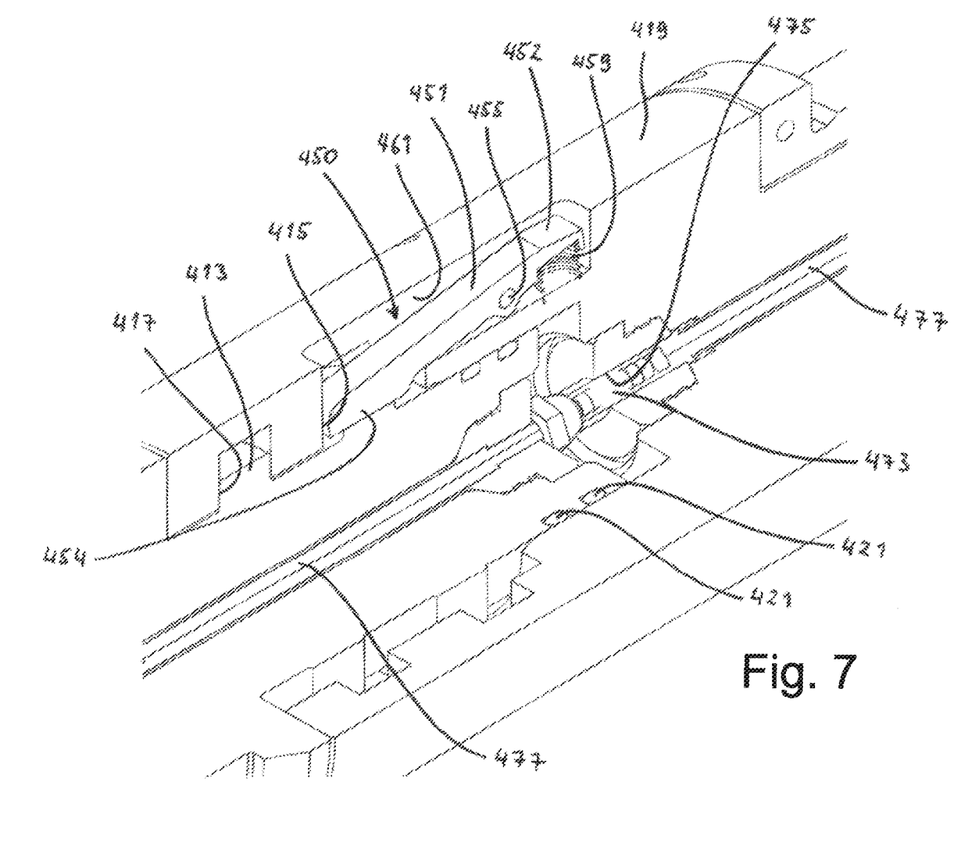
FIG. 7 is an enlarged portion of the view shown in FIG. 6.

FIG. 7 is an enlarged version of a part of FIG. 6, depicting the latching arrangement 450 in better detail.

The latching lever 451 is pivotally connected to the box part housing 401 by means of a hinge pin 455 extending through an aperture in the latching lever. The hinge pin 455 is supported in a bore 457 in the box part housing 419, as indicated in FIG. 3 and FIG. 4. At one side of the hinge pin 455, there is between the latching lever 451 and a portion of the box part housing 419 arranged a latching spring 459. The latching spring 459 biases the latching lever 451 towards the latched mode, which is the mode shown in FIG. 9.

As can be appreciated, it will not be possible to rotate the pin part 403 with respect to the box part 401 when the latching lever 451 is in engagement with the latching groove 453. To release the latching engagement, the operator must push the latching lever 451 down at the location of the latching spring 459, to lift the latching lever 451 from its engagement with the latching groove 453. At this position of the latching lever 451, the latching lever 451 has an unlatching face 452. At the opposite end of the latching lever 451, the latching lever 451 has a latching part 454. The latching part 454 is the part of the latching lever 451 that engages the latching groove 453.

When rotating the pin part 403 from an unlatched mode, as shown in FIG. 8, towards the latched mode, as shown in FIG. 9, the outer perimeter of the front lug 411 will function as a cam that lifts the latching lever 451, until it falls into the latching groove 453.

The latching lever 451 is located in a lever recess 461 formed in the box part housing 419. When in the latched mode and when in the un-latched mode, the latching lever 451 will remain recessed within the outer perimeter of the box part housing 419. Consequently, the latching lever 451 will be protected from impacts from external elements, such as debris or other objects inside a well.

Advantageously, the distance between the latching part 454 and the hinge of the latching lever 451 (i.e. the position of the hinge pin 455 in this embodiment) is longer than the distance between the unlatching face 452 and the hinge of the latching lever 451.

Advantageously, the axial direction of the hinge pin 455 is orthogonal to the longitudinal direction of the connector 400. More precisely, the axial direction of the hinge pin 455 is orthogonal to the axis about which the pin part 403 is rotated when rotating between the unlatched and latched state. These two states are depicted in FIG. 8 and FIG. 9, respectively.

The connector 400 further comprises an electric connection arrangement 470. As depicted in FIG. 5, an electric contact 471 is arranged at the rear portion of the pin part 403 and at the front portion of the box part 401. Thus, when the connector 400 is in a connected mode, an electric guide is provided between these two electric contacts 471, of which one is arranged at respective opposite ends of the connector 400.

As shown in FIG. 8, in the portion of the receiving cavity 405 which is sealed off from the ambience with the seals 421, an electric contact pin 473 of the pin part 403 is configured to enter into electric contact with an electric female contact receptacle 475 of the box part 401.

In the pin part 403, the electric contact 471 and the electric contact pin 473 are electrically connected with an insulated electric conductor 477. Correspondingly, in the box part 401, the electric contact 471 and the electric female contact receptacle 475 are electrically connected with an insulated electric conductor 477.

Notably, the electric contact pin 473 can be rotated with respect to the electric female contact receptacle 475 when they are engaged, such as shown in FIG. 8 and FIG. 9.

The connector 400 is thus configured to be quickly connected and disconnected, to transfer a large pulling force, and to transmit electric signals and/or power.

As will be appreciated, the connector 400 may be applicable for connection of a wellbore tool to a line, such as the line 703 depicted in FIG. 1. The connector 400 is particularly useful when running a wellbore tool, which requires electric power and/or electric signal communication, on an electric line inside a well.

The invention claimed is:

1. A force-transferring wellbore connector capable of transferring a pulling force between a wireline and a wireline wellbore tool to be run into a wellbore on the wireline, wherein the force-transferring wellbore connector is interchangeable between a connected and a non-connected mode, the force-transferring wellbore connector comprising:
a box part;
a pin part;
wherein the pin part comprises a pin section configured to be inserted into a receiving cavity of the box part;
wherein the pin section comprises at least one lug, and the box part comprises at least one locking shoulder;
wherein, when the pin section is located inside the receiving cavity, the at least one lug is configured to rotate between a non-engaged state in which the at least one lug does not engage the locking shoulder and an engaged state in which the at least one lug engages the locking shoulder, so that, when in the engaged state, engagement between the locking shoulder and the at least one lug prevents the pin section from movement out of the receiving cavity, and the pulling force is transferable between the wireline and the wireline wellbore tool via the box part and the pin part;
an electric connection arrangement internal to the force-transferring wellbore connector configured to guide at least one of electric power and electric signals, and no part of the pulling force, from the wireline to the wireline wellbore tool through the force-transferring wellbore connector, the electric connection arrangement comprising an electric contact pin and an electric female contact receptacle;
wherein the electric connection arrangement is put into a connected state when the pin section is inserted into the receiving cavity and put into a non-connected state when the pin section is not inserted into the receiving cavity; and
wherein, during rotation between the non-engaged state and the engaged state, the electric contact pin rotates with respect to the electric female contact receptacle.

2. The force-transferring wellbore connector according to claim 1, comprising:
a latching arrangement configured to latch the force-transferring wellbore connector in the connected mode; and
wherein the latching arrangement comprises a latching groove in the at least one lug and a latching lever configured to move radially between a latching position in which a part of the latching lever is located in the latching groove and a non-latched position in which the latching lever is outside the latching groove.

3. The force-transferring wellbore connector according to claim 2, wherein at least a portion of the latching lever and a seal configured to abut against a cylindrical inner wall of an inner portion of the receiving cavity are arranged at a same axial position of the force-transferring wellbore connector.

4. The force-transferring wellbore connector according to claim 1, wherein a latching lever is hinged to the box part and is configured to pivot about a pivot axis directed orthogonally with respect to the longitudinal direction of the force-transferring wellbore connector.

5. The force-transferring wellbore connector according to claim 4, wherein the latching lever has a latching part configured to engage a latching groove, and the distance between a remote portion of the latching part and a hinge pin of the latching lever is longer than the distance between a remote portion of an unlatching face and the hinge pin.

6. The force-transferring wellbore connector according to claim 1, wherein a latching lever is recessed in a lever recess formed in a box part housing.

7. The force-transferring wellbore connector according to claim 6, wherein, when in a latched mode and when in an un-latched mode, the latching lever remains recessed within the outer perimeter of the box part housing.

8. The force-transferring wellbore connector according to claim 1, wherein, when altering between the engaged and non-engaged state by rotation of the pin part with respect to the box part, the pin part is rotated less than 180 degrees.

9. The force-transferring wellbore connector according to claim 8, wherein, when altering between the engaged and non-engaged state by rotation of the pin part with respect to the box part, the pin part is rotated less than 100 degrees.

10. The force-transferring wellbore connector according to claim 8, wherein, when altering between the engaged and non-engaged state by rotation of the pin part with respect to the box part, the pin part is rotated 90 degrees.

11. The force-transferring wellbore connector according to claim 1, wherein the pin section at a cylindrical front part thereof comprises two seals configured to abut against a cylindrical inner wall of an inner portion of the receiving cavity.

12. The force-transferring wellbore connector according to claim 1, comprising:
 a latching arrangement configured to latch the force-transferring wellbore connector in the connected mode that comprises a latching lever configured to move between a latching position and a non-latched position;
 a seal configured to abut against a cylindrical inner wall of an inner portion of the receiving cavity; and
 wherein at least a portion of the latching lever and of the seal are arranged at a same axial position of the force-transferring wellbore connector.

13. The force-transferring wellbore connector according to claim 1, wherein the pin section comprises a seal configured to abut against an inner wall of an inner portion of the receiving cavity and seal the electrical connection from an ambient environment of the force-transferring wellbore connector.

14. A method of performing a well operation inside a wellbore by using a wireline wellbore tool, the method comprising:
 a) connecting the wellbore tool to a line and running the tool into the wellbore on the line;
 during step a), connecting the wellbore tool to the line with the force-transferring wellbore connector according to claim 1, thereby providing a mechanical force-transferring connection that transfers the pulling force between the box part and the pin part and at least one of an electric signal and a power-transferring connection.

* * * * *